(12) United States Patent
Oertley et al.

(10) Patent No.: US 6,431,008 B1
(45) Date of Patent: Aug. 13, 2002

(54) METHOD AND APPARATUS FOR DETERMINING A SLACK-SIDE TENSION OF A TRACK ON AN EARTHWORKING MACHINE

(75) Inventors: Thomas E. Oertley, Dunlap; Dennis R. Shookman, Washington; Jin Suzuki; Daniel L. Mikrut, both of Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/703,128

(22) Filed: Oct. 31, 2000

(51) Int. Cl.7 ................................................. G01N 3/08
(52) U.S. Cl. ...................................................... 73/828
(58) Field of Search .......................... 73/826, 828, 829, 73/862.451, 862.453, 862.454, 862.581

(56) References Cited

U.S. PATENT DOCUMENTS

| | | | |
|---|---|---|---|
| 3,972,569 A | 8/1976 | Bricknell | |
| 4,657,131 A | * 4/1987 | Brychta et al. | 198/810 |
| 4,840,437 A | 6/1989 | Henry et al. | |
| 4,887,872 A | 12/1989 | Adams et al. | |
| 5,005,920 A | 4/1991 | Kinsinger | |
| 5,167,159 A | * 12/1992 | Lucking | 73/862.451 |
| 5,316,381 A | 5/1994 | Isaacson et al. | |
| 5,368,375 A | 11/1994 | Gustafson | |
| 5,390,996 A | 2/1995 | Bliss | |
| 5,407,396 A | * 4/1995 | Gilbert | 474/80 |
| 6,024,183 A | 2/2000 | Dietz et al. | |

* cited by examiner

*Primary Examiner*—Max Noori
(74) *Attorney, Agent, or Firm*—Steve D. Lundquist

(57) ABSTRACT

A method and apparatus for determining a tension of a track on an earthworking machine, the track having a front catenary portion and a rear catenary portion. The method and apparatus includes determining a direction of motion of the earthworking machine, determining a value of tension of the front catenary portion in response to determining the direction of motion of the earthworking machine to be in a forward direction, and determining a value of tension of the rear catenary portion in response to determining the direction of motion of the earthworking machine to be in a reverse direction.

18 Claims, 5 Drawing Sheets

Fig_1_

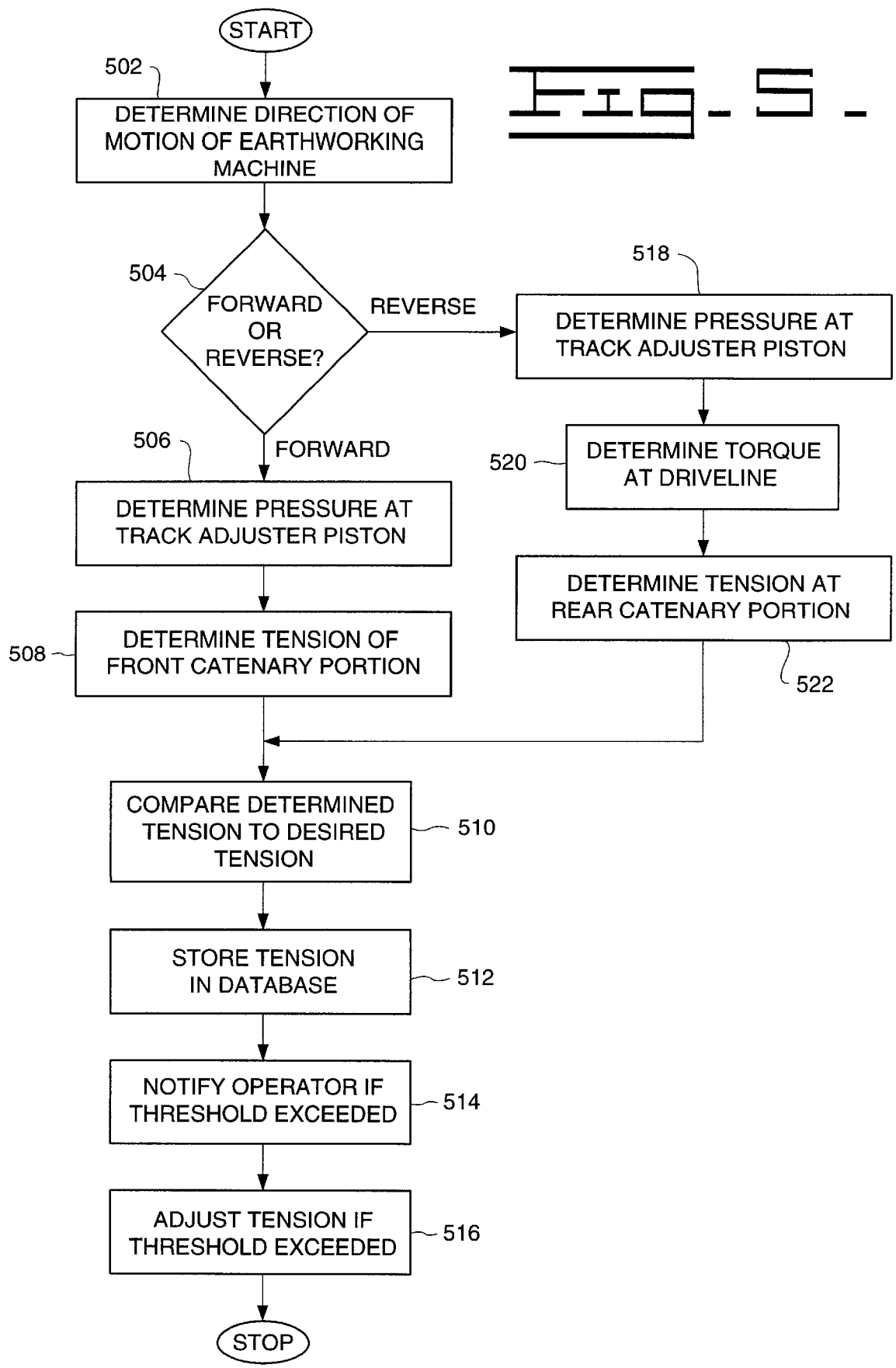

METHOD AND APPARATUS FOR DETERMINING A SLACK-SIDE TENSION OF A TRACK ON AN EARTHWORKING MACHINE

TECHNICAL FIELD

This invention relates generally to a method and apparatus for monitoring the tension of a track on an earthworking machine and, more particularly, to a method and apparatus for determining the tension on the slack-side of a track on an earthworking machine.

BACKGROUND ART

Earthworking machines which use track-type propulsion, e.g., track-type tractors, tracked agricultural machines, track-type loaders, excavators, and the like, are frequently used in earthworking applications due to the inherent advantages obtained from the use of tracks as compared to comparable wheeled machines. For example, tracked machines offer greater traction and improved flotation in wet or loose soils and sands.

The tracks on a tracked machine are subjected to heavy loading in typical earthworking operations. In particular, larger tracked machines, by nature of their increased power capabilities and increased demands on their performance, are prone to place great load demands on the tracks. Historically, the high load demands have been compensated for by increasing the strength and durability of the track components. However, these increases are also accompanied by increased costs. In addition, the increases in strength of the track components are limited by practical considerations, such as physical constraints.

One of the more significant sources of stress in the tracks of the tracked machine is caused by improper tension in the slack catenary portions of the track, i.e., those portions of the track which are designed to exhibit some slack as a function of the direction of travel of the earthworking machine. For example, undue stress on the track may be caused by too much tension in the slack catenary portions. Therefore, it is desired to have the capability to monitor the tension in the catenary portions of the track for the purpose of controlling the slack-side tension and reducing the stress being placed on the tracks of a track-type earthworking machine.

The present invention is directed to overcoming one or more of the problems as set forth above.

DISCLOSURE OF THE INVENTION

In one aspect of the present invention a method for determining a tension of a track on an earthworking machine, the track having a front catenary portion and a rear catenary portion, is disclosed. The method includes the steps of determining a direction of motion of the earthworking machine, determining a value of tension of the front catenary portion in response to determining the direction of motion of the earthworking machine to be in a forward direction, and determining a value of tension of the rear catenary portion in response to determining the direction of motion of the earthworking machine to be in a reverse direction. In another aspect of the present invention an apparatus for determining a tension of a portion of a track on an earthworking machine, the track having a front catenary portion and a rear catenary portion, is disclosed. The apparatus includes means for determining a direction of motion of the earthworking machine, and a controller located on the earthworking machine, the controller being adapted to determine a value of tension of the front catenary portion in response to determining the direction of motion of the earthworking machine to be in a forward direction, and determine a value of tension of the rear catenary portion in response to determining the direction of motion of the earthworking machine to be in a reverse direction.

BRIEF DESCRIPTION OF THE DRAWINGS

FIG. 5 is a flow diagram illustrating a preferred method of the present invention.

BEST MODE FOR CARRYING OUT THE INVENTION

Figure 1:
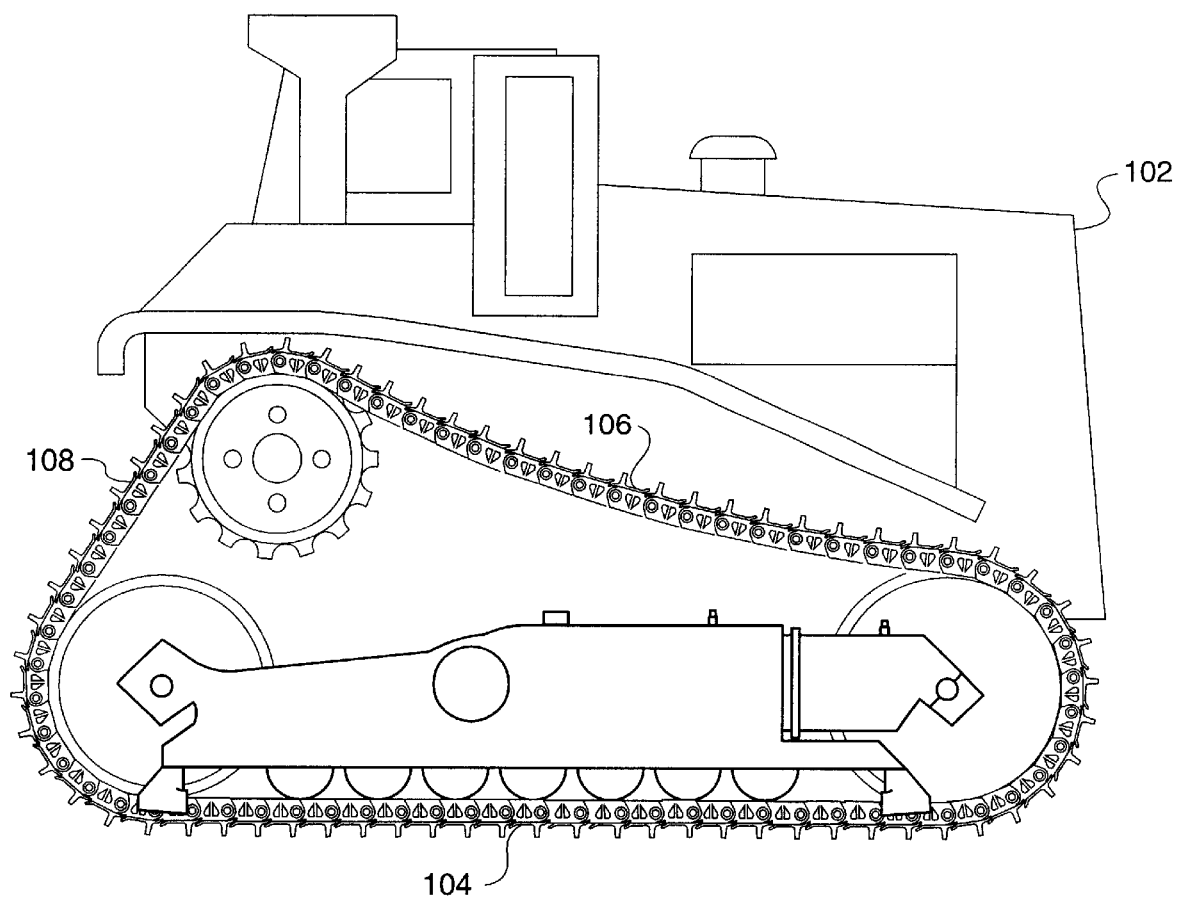
FIG. 1 is a diagrammatic illustration of an earthworking machine suitable for use with the present invention.

Referring to the drawings, a method and apparatus 100 for determining a tension of a portion of a track 104 on an earthworking machine 102 is shown. In the preferred embodiment, the track 104 has a front catenary portion 106 and a rear catenary portion 108; that is, the front and rear catenary portions 106,108 are designed to provide a slack-side to the track 104 as a function of the earthworking machine 102 moving in one of a forward and reverse direction. For example, when the earthworking machine 102 moves in a forward direction, the front catenary portion 106 provides the slack-side. Furthermore, when the earthworking machine 102 moves in a reverse direction, the rear catenary portion 108 provides the slack-side. It is important for an appropriate one of the front and rear catenary portions 106,108 of the track 102 to provide a proper slack-side tension to avoid overloading and unduly stressing the track 104 as the earthworking machine 102 moves.

Figure 2:
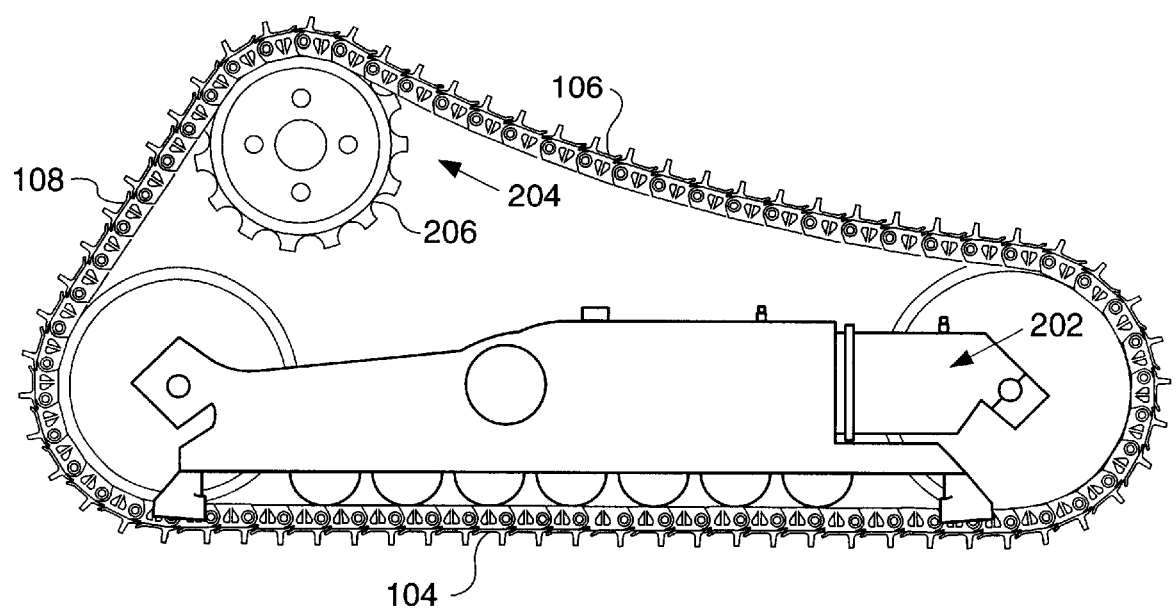
FIG. 2 is a diagrammatic illustration of a track assembly of the machine of FIG. 1.

Referring to FIG. 1, the earthworking machine 102 is depicted as a track-type tractor. More particularly, the earthworking machine 102 is a track-type tractor having tracks 104 with "elevated sprockets"; i.e., each track 104 is drivably connected to a sprocket 206, which is in turn drivably connected to a driveline 204, as shown in FIG. 2. However, it is noted that, for purposes of the present invention, the tracks need not be driven by elevated sprockets, but rather may be of more conventional design; that is, the tracks may assume an oval shape, as is well known in the art.

The front catenary portion 106 of each track 104 is generally regarded as the upper portion of track 104 from the sprocket 206 to the front of the earthworking machine 102. In like manner, the rear catenary portion 108 is generally regarded as the upper portion of track 104 from the sprocket 206 to the rear of the earthworking machine 102.

Although the earthworking machine 102 is shown as a track-type tractor, other types of tracked machines, e.g., loaders, agricultural machines, excavators, and the like, may also benefit from use of the present invention.

Figure 3:
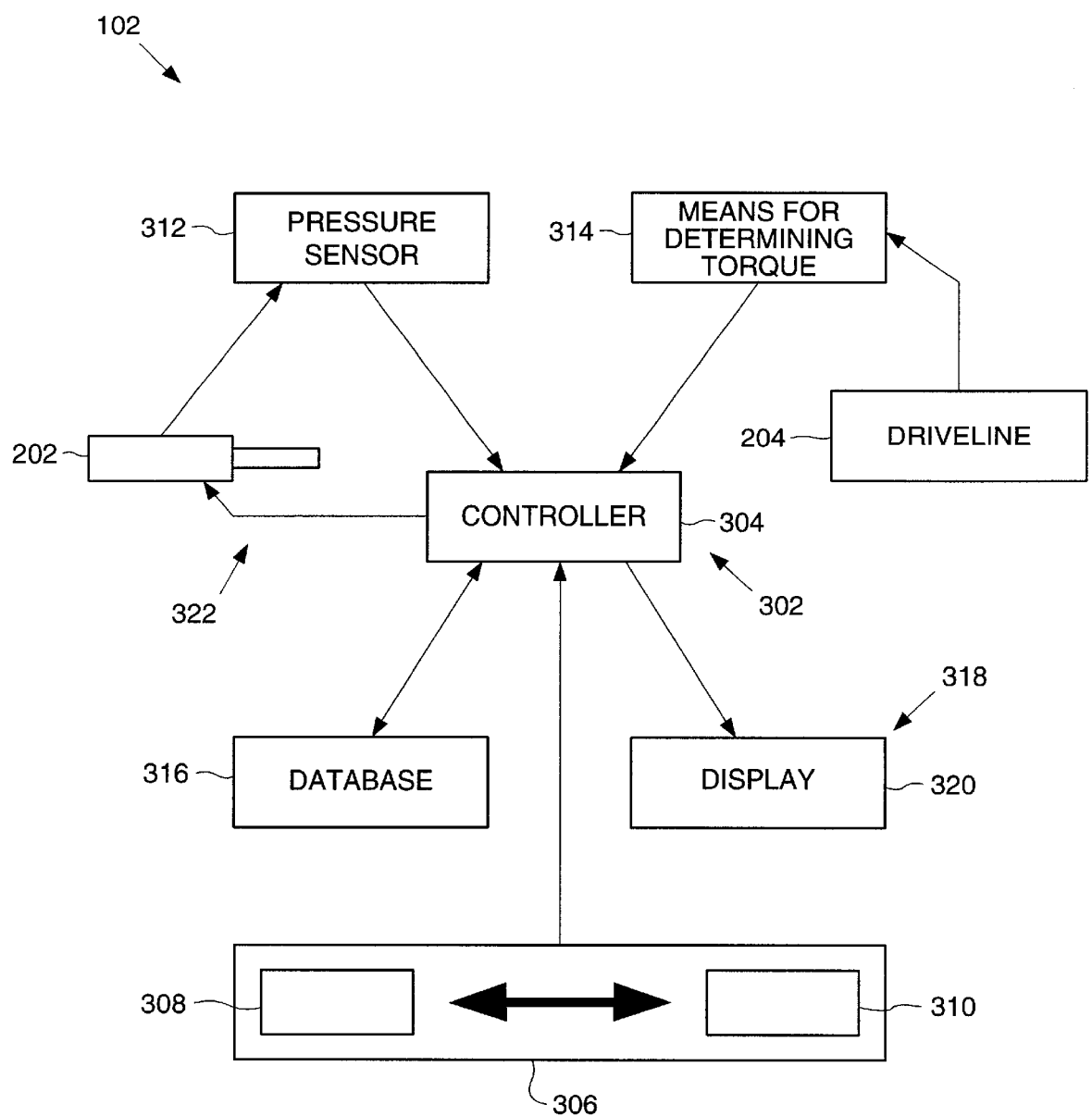
FIG. 3 is a block diagram illustrating a preferred embodiment of the present invention.

Referring to FIG. 3, a block diagram illustrating a preferred embodiment of the present invention is shown. Preferably, the objects depicted in FIG. 3 are located on the earthworking machine 102. However, where appropriate, some objects may be located elsewhere, e.g., at a remote site or on another machine, without deviating from the spirit of the present invention. For example, a database 316 may be located on the earthworking machine 102, remote from the earthworking machine 102, or more than one database 316 may exist at both locations.

A means 302 for controlling is adapted to, among possible other functions, provide a means for determining tension of the track 104, and to respond as desired the means for determining tension, i.e., the means 302 for controlling, is described in more detail below. In the preferred embodiment, the means 302 for controlling includes a controller 304, and is referred to as a controller 304 in the discussion below.

A means 306 for determining a direction of motion of the earthworking machine 102 preferably includes two components. First, a means 308 for determining a gear engaged is adapted to determine if one of a forward direction and reverse direction gear (not shown) in a transmission (not shown) is engaged. For example, if a forward direction gear is engaged, the earthworking machine 102 is determined to be prepared for motion in a forward direction, and if a reverse direction gear is engaged, the earthworking machine 102 is determined to be prepared for motion in a reverse direction. In addition, if no gear is engaged, it is determined that the earthworking machine 102 is not prepared to move at all.

Second, the means 306 for determining a direction of motion preferably includes a means 310 for determining motion; that is, for determining that the earthworking machine 102 is moving. Examples of means 310 for determining motion include, but are not limited to, ground speed sensors, driveline motion sensors, machine position sensors, and the like.

It is noted that the means 306 for determining motion may employ techniques other than the above described means. For example, a position sensor, such as a GPS antenna, located on the earthworking machine 102, may be used to determine both motion and direction of travel by taking successive position measurements.

Once the means 306 for determining a direction of motion determines that the earthworking machine 102 is moving in one of a forward or reverse direction, the information is delivered to the controller 304, which in turn is adapted to determine a value of tension of either the front or rear catenary portions 106,108 of the track 104 in response to determining the direction of motion of the earthworking machine 102 to be in a corresponding one of a forward or reverse direction.

A track adjuster piston 202, located on the earthworking machine 102, is adapted to adjust the tension of the track by applying pressure against the track 102. Preferably, the track adjuster piston 202 is hydraulically actuated. Details of track adjustment techniques are well known in the art and will not be discussed further.

A pressure sensor 312, located on the earthworking machine 102, is adapted to sense a value of pressure P applied by the track adjuster piston 202. The pressure sensor 312 is also adapted to deliver the value of pressure P to the controller 304.

A means for determining torque 314, located on the earthworking machine 102, is adapted to sense a value of torque on the driveline, and responsively deliver the value of torque to the controller 304. The means for determining torque 314 may include a torque sensor or may use alternative techniques such as monitoring various parameters of the earthworking machine 102 and responsively determining a value of torque on the driveline 204. For example, engine speed, ground speed, and other parameters may be used, as is well known in the art, to compute torque of a driveline.

A database 316 is adapted to receive information from the controller 304, such as data relating to the tension of the tracks 104. The database 316, as described above, may be located either on the earthworking machine 102 or at some remote location. In the preferred embodiment, the database 316 is configured as an historical database, and is adapted to receive and store successive information, such as successive determined values of tension of the tracks 104. The stored information may then be used for any of a variety of purposes, such as monitoring the loading and stress applied to the tracks 104 over time, trending wear of the tracks 104 for maintenance purposes, determining specific work conditions that are more stressful to the tracks 104 than others, and the like.

A means 318 for displaying is adapted to display data pertaining to the determined tension of at least one of the front and rear catenary portions 106,108 of the track 104. Preferably, the means 318 for displaying is a display 320, and may be suited to display graphics, text, or both. Alternatively, the display 320 may be a light indicator to indicate a condition of the tension being out of tolerance. The display 320 may be located on the earthworking machine 102, may be located at a remote site, or multiple displays may be used at multiple locations.

In one embodiment of the present invention, the controller 304 is adapted to provide information to the display 320 to allow human intervention if desired, e.g., either manually adjusting the tension of the track 104 or stopping operation of the earthworking machine 102. In another embodiment, the controller 304 is adapted to adjust the tension of the track 104 in response to a determination that the tension is beyond a desired threshold. In this embodiment, the controller 304 and the track adjuster piston 202 function as a means 322 for adjusting tension of the track 104.

Figure 4:
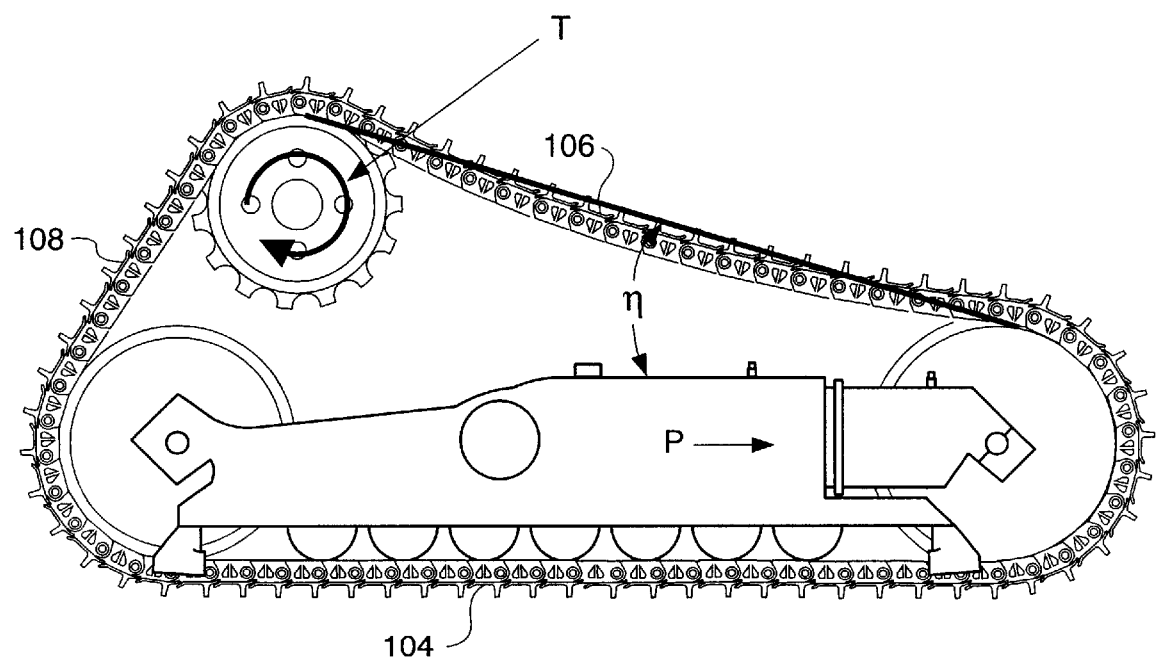
FIG. 4 is a diagrammatic illustration of the track of FIG. 2 depicting relevant forces and angles.

Referring to FIG. 5, a flow diagram illustrating a preferred method of the present invention is shown. During discussion of the preferred method of FIG. 5, reference is also made to FIG. 4, in which the torque T of the driveline 204, the pressure P of the track adjuster piston 202, and an angle η are depicted. The angle η is the angle between a longitudinal axis (not shown) through the track adjuster piston 202 and an axis along the upper track portion from the front of the earthworking machine 102 to the sprocket 206.

In a first control block 502, the direction of motion of the earthworking machine 102 is determined by the techniques described above. In a first decision block 504, it is determined if the direction of motion is forward or reverse. If the direction of motion is determined to be forward, control proceeds to a second control block 506.

In the second control block 506, the pressure at the track adjuster piston 202 is determined, preferably by use of the pressure sensor 312. In a third control block 508, the tension of the front catenary portion is determined, preferably by the following method.

Generically, the track tension is determined as:

$$TT = \frac{RF}{2\cos\eta} \quad \text{(Eq. 1)}$$

where TT is track tension, and RF is recoil force, which refers to the resultant force which the chain of the track 104 exerts on the front idler.

The recoil force is determined by:

$$RF = RT * A_p \quad \text{(Eq. 2)}$$

where RT is the recoil tension, and $A_p$ is the cross section area of the track adjuster piston 202.

During forward motion of the earthworking machine 102, RT is equal to P, the pressure applied by the track adjuster piston 202. Thus, the equation for determining tension during forward motion becomes:

$$TT_F = \frac{P * A_p}{2\cos\eta} \quad (\text{Eq. 3})$$

where $TT_F$ is the tension of the track 104 at the front catenary portion 106.

It is noted that the term $A_p/2 \cos \eta$ is a constant term derived for a particular earthworking machine 102. Therefore, $TT_F$ is directly proportional to P. Thus, an alternative embodiment for determining tension of the track 104 during forward motion is to determine the pressure P and use that value for subsequent determinations for the present invention.

Referring back to the first decision block 504, if it is determined that the earthworking machine 102 is moving in a reverse direction, control proceeds to a fourth control block 518, in which the pressure P at the track adjuster piston 202 is determined, preferably by the pressure sensor 312.

In a fifth control block 520, the torque at the driveline 204 is determined, preferably by the means for determining torque 314.

In a sixth control block 522, the tension at the rear catenary portion 108 is determined, preferably by a method similar to the method described above with reference to the front catenary portion 106. However, for reverse motion of the earthworking machine 102:

$$RT = P - (K*T) \quad (\text{Eq. 4})$$

where T is the torque at the driveline, and K is an empirical constant derived as a function of the type of earthworking machine 102 being used. Therefore, the equation for tension during reverse motion of the rear catenary portion 108 becomes:

$$TT_R = \frac{(P - K*T)*A_p}{2\cos\eta} \quad (\text{Eq. 5})$$

From either the third control block 508 or the sixth control block 522, control proceeds to a seventh control block 510, in which the determined value of tension is compared to a desired value of tension. The desired value of tension may be a value that is the optimal value of tension for the working conditions of the earthworking machine 102. Alternatively, the desired value of tension may be a range of values that are considered acceptable.

In an eighth control block 512, the determined value of tension is stored in a database 316, as described above.

In a ninth control block 514, an operator of the earthworking machine 102 is notified if a predetermined threshold of deviation of the determined value of tension from the desired value of tension is exceeded. Preferably, the operator is notified by way of the display 320. In the alternative, a person other than the operator, e.g., a supervisor, may be notified.

In a tenth control block 516, the controller 304 delivers a command to the track adjuster piston 202, and the tension of the track 104 is adjusted to maintain the tension within the predetermined threshold.

INDUSTRIAL APPLICABILITY

As an example of an application of the present invention, an earthworking machine 102, such as a track-type tractor, performs work functions which cause loading and stress on the tracks 104 of the machine 102. The stress is much worse if the slack-side tension is not maintained at an optimal value, i.e., there must be an adequate amount of slack in either the front or rear catenary portion 106,108.

The present invention is designed to determine and monitor the appropriate slack-side tension during operation, and either warn an operator or adjust the tension if values exceed desired thresholds. Preferably, the determined values are averaged over time to minimize errors from nonlinearities caused by momentary and abrupt changes in the determinations. For example, track slip or boulders being struck may cause determinations beyond the threshold which are not indicative of true operation of the earthworking machine. The time-averaged determined values may be collected over a period of time to help determine trends in machine operation or to monitor operator work performance. Other aspects, objects, and features of the present invention can be obtained from a study of the drawings, the disclosure, and the appended claims.

What is claimed is:

1. A method for determining a tension of a portion of a track on an earthworking machine, the track having a front catenary portion and a rear catenary portion, including the steps of:

determining a direction of motion of the earthworking machine;

determining a value of tension of the front catenary portion in response to determining the direction of motion of the earthworking machine to be in a forward direction; and determining a value of tension of the rear catenary portion in response to determining the direction of motion of the earthworking machine to be in a reverse direction.

2. A method, as set forth in claim 1, wherein determining a value of tension of the front catenary portion includes the steps of:

determining a value of pressure applied by a track adjuster piston located on the earthworking machine; and determining a value of tension of the front catenary portion as a function of the value of pressure at the track adjuster piston.

3. A method, as set forth in claim 1, wherein determining a value of tension of the front catenary portion includes the step of determining a value of pressure applied by a track adjuster piston located on the earthworking machine, the pressure being proportional to the tension as a function of a known constant of proportionality.

4. A method, as set forth in claim 1, wherein determining a value of tension of the rear catenary portion includes the steps of:

determining a value of pressure applied by a track adjuster piston located on the earthworking machine;

determining a value of torque on a driveline located on the earthworking machine; and determining a value of tension of the rear catenary portion as a function of the value of pressure at the track adjuster piston, and the value of torque on the driveline.

5. A method, as set forth in claim 1, further including the step of comparing the determined value of tension to a desired value of tension.

6. A method, as set forth in claim 5, further including the step of notifying an operator of the earthworking machine in response to a difference between the determined value of tension and the desired value of tension being greater than a predetermined threshold.

7. A method, as set forth in claim 5, further including the step of adjusting the tension of the track in response to a difference between the determined value of tension and the desired value of tension being greater than a predetermined threshold.

8. A method, as set forth in claim 1, further including the step of storing the determined value of tension in a database.

9. A method, as set forth in claim 8, wherein the database is an historical database, and further including the step of recording successive determined values of tension in the historical database.

10. An apparatus for determining a tension of a portion of a track on an earthworking machine, the track having a front catenary portion and a rear catenary portion, comprising:

means for determining a direction of motion of the earthworking machine; and a controller located on the earthworking machine, the controller being adapted to:

determine a value of tension of the front catenary portion in response to determining the direction of motion of the earthworking machine to be in a forward direction; and determine a value of tension of the rear catenary portion in response to determining the direction of motion of the earthworking machine to be in a reverse direction.

11. An apparatus, as set forth in claim 10, wherein the means for determining a direction of motion of the earthworking machine includes means for determining a gear engaged in a transmission located on the earthworking machine as being one of a forward and reverse gear.

12. An apparatus, as set forth in claim 11, wherein the means for determining a direction of motion of the earthworking machine includes means for determining the earthworking machine to be in motion.

13. An apparatus, as set forth in claim 10, further including:

a track adjuster piston located on the earthworking machine; and a pressure sensor located on the earthworking machine for sensing a value of pressure applied by the track adjuster piston.

14. An apparatus, as set forth in claim 10, wherein the earthworking machine includes a driveline, and further including means for determining torque on the driveline.

15. An apparatus, as set forth in claim 10, further including a database for receiving and storing data from the controller.

16. An apparatus, as set forth in claim 10, further including means for displaying data pertaining to the determined tension of at least one of the front and rear catenary portions of the track.

17. An apparatus, as set forth in claim 10, further including means for adjusting the tension of the track in response to the determined tension of at least one of the front and rear catenary portions of the track.

18. An apparatus for determining a tension of a portion of a track on an earthworking machine, the track having a front catenary portion and a rear catenary portion, comprising:

means for determining a direction of motion of the earthworking machine;

means for determining a value of tension of the front catenary portion in response to determining the direction of motion of the earthworking machine to be in a forward direction; and means for determining a value of tension of the rear catenary portion in response to determining the direction of motion of the earthworking machine to be in a reverse direction.

* * * * *